United States Patent [19]

Ferdows

[11] Patent Number: 5,184,474
[45] Date of Patent: Feb. 9, 1993

[54] ROOF-MOUNTED AIR CONDITIONING SYSTEM WITH BUILT-IN COMPRESSOR

[75] Inventor: Houshang Ferdows, Boulder, Colo.

[73] Assignee: Suetrak Air Conditioning Sales Corp., Commerce City, Colo.

[21] Appl. No.: 792,965

[22] Filed: Nov. 15, 1991

[51] Int. Cl.[5] .............................................. F25D 17/06
[52] U.S. Cl. .............................. 62/244; 62/DIG. 16; 62/428; 62/508
[58] Field of Search ................ 62/DIG. 16, 244, 508, 62/428, 429

[56] References Cited

U.S. PATENT DOCUMENTS

| | | | |
|---|---|---|---|
| 2,054,350 | 9/1936 | Weiland | 62/244 |
| 4,043,143 | 8/1977 | Fluder et al. | 62/244 X |
| 4,641,502 | 2/1987 | Aldrich et al. | 62/DIG. 16 |
| 4,679,616 | 7/1987 | Ferdows et al. | 165/153 |
| 4,905,478 | 3/1990 | Matsuda et al. | 62/244 |
| 5,005,372 | 4/1991 | King | 62/DIG. 16 |

Primary Examiner—William E. Tapolcai
Attorney, Agent, or Firm—John E. Reilly

[57] ABSTRACT

A roof-mounted air conditioning system has a built-in compressor compartment between the condensor and evaporator sections, the fans in the condensor section inducing the flow of air through the compressor compartment and into the condensor section through louvered vents in the partition wall between the compressor and condensor sections, and the air flowing from the compressor compartment is confined to flow directly across the condensor coils so as to satisfy the normal cooling requirements in the condensor section.

16 Claims, 2 Drawing Sheets

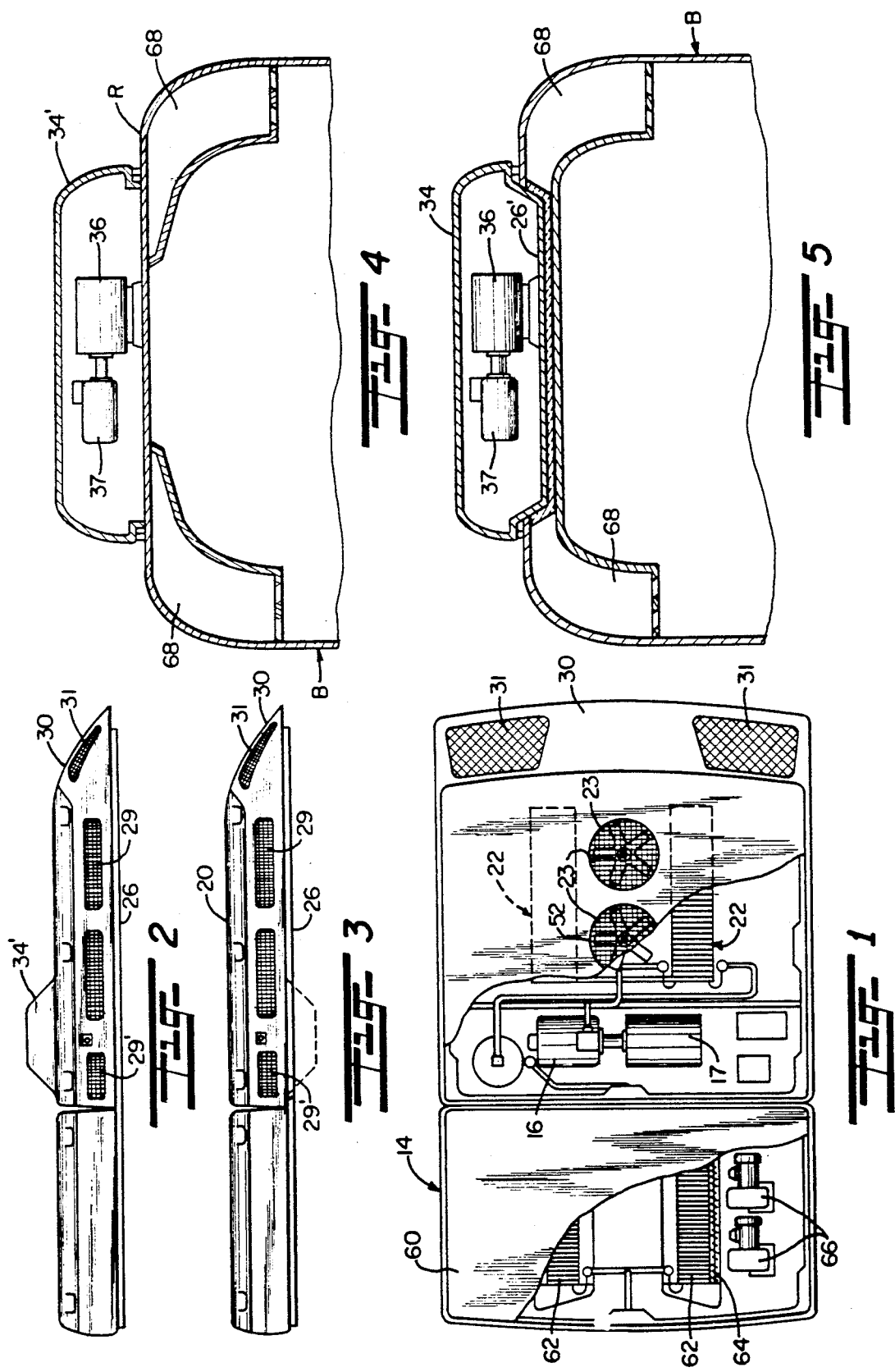

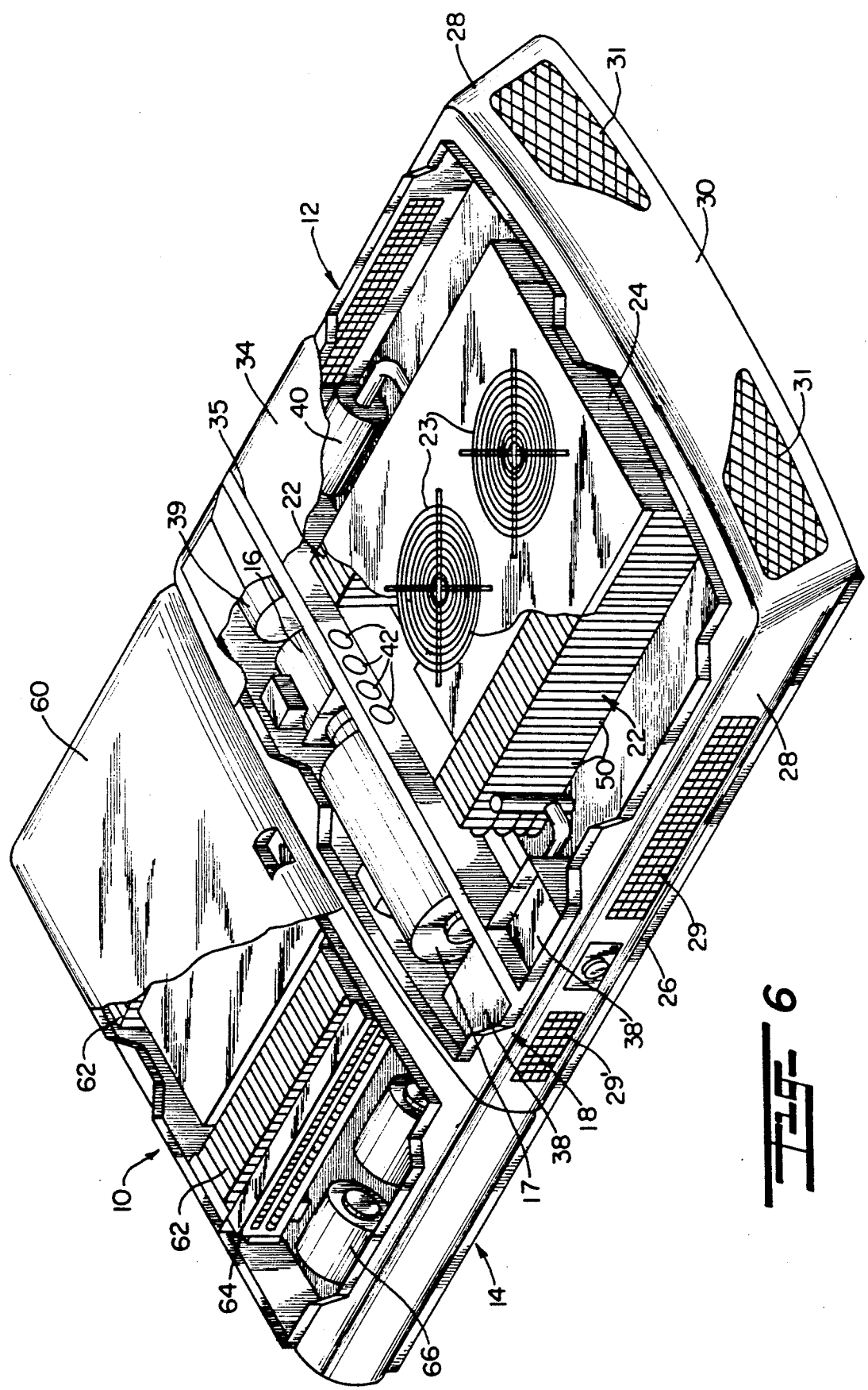

ROOF-MOUNTED AIR CONDITIONING SYSTEM WITH BUILT-IN COMPRESSOR

Specification

The present invention relates to air conditioning systems; and more particularly relates to a novel and improved roof-mounted air conditioning system for motor vehicles, such as, busses or rail cars and specifically of the type incorporating a built-in, roof-mounted compressor section as a unitary part of the system.

BACKGROUND AND FIELD OF THE INVENTION

Roof-mounted air conditioning systems for passenger busses, railway cars and the like have been devised either in which the condensor and evaporator sections are in a common housing or are in separate housings so as to be more readily conformable for mounting at different locations on the roof or exterior of the vehicle. For example, reference is made to my U.S. Pat. No. 4,679,616 for a modular arrangement of evaporator and condensor units on the roof of a vehicle. Moreover, there are applications where it becomes desirable to be able to incorporate the compressor for the air conditioning system into the roof of the vehicle and thereby avoid lengthy connecting lines between the compressor and the rest of the air conditioning system.

In the past, it has been proposed to incorporate the compressor into a roof-mounted air conditioning system and, for example, U.S. Pat. No. 4,905,478 illustrates several variations on this approach. However, there is generally lacking in the prior art a recognition of the problems associated with mounting of the compressor on the roof and particularly when installed in direct association with the condensor section. Thus, it is important that the compressor be mounted in proper load-balanced relation to the roof and in such a way as not to appreciably increase wind resistance. Further, it is important that the compressor section be cooled but not to such an extent as to draw in excessive amounts of moisture which will have a deleterious effect on the operation of the compressor motor; and to carry out cooling without the necessity of additional cooling fans or other auxiliary cooling devices.

SUMMARY OF THE INVENTION

Accordingly, it is an object of the present invention to provide for a novel and improved air conditioning system for vehicles, such as, passenger busses and railway cars which is of the type incorporating a built-in roof-mounted compressor section therein.

Another object of the present invention is to provide in an air conditioning system for novel and improved modular condensor, compressor and evaporator sections which can be integrated in a unique way into the roof of the vehicle.

A further object of the present invention is to provide in an air conditioning system of the type incorporating a compressor section in direct association with a condensor section for a novel and improved method and means for cooling the compressor as well as condensor sections.

It is a further object of the present invention to provide in a roof-mounted air conditioning system for busses, railway cars and the like for a built-in compressor section which can be integrated into the condensor section of the system and cooled in such a way as not to overload the rest of the system and at the same time effectively meet all heating and cooling requirements of the vehicle.

In accordance with the present invention, an air conditioning system is adapted to be mounted on the roof of a vehicle wherein a condensor section includes a housing mounted on the roof, at least one condensor coil mounted in the housing with air circulating means directing air from the outside through an intake opening in the housing across the condensor coil, an evaporator section, and means for conducting a refrigerant between the condensor and evaporator sections, and the improvement comprises a compressor mounted in a separate compartment on the roof adjacent to the condensor section, air intake means for directing outside air through the compressor compartment, air flow control means for establishing communication between the compressor compartment and condensor section whereby the air circulating means will induce a controlled amount of air flow from the compressor compartment into the condensor section, and means for confining the flow of air from the compressor compartment across the condensor coil in the condensor section.

The above and other objects, advantages and features of the present invention will become more readily appreciated and understood from a consideration of the following detailed description when taken together with the accompanying drawings in which:

BRIEF DESCRIPTION OF THE DRAWINGS

FIG. 1 is a top plan view with portions of the housings broken away to illustrate the interrelationship between parts in a preferred form of air conditioning system in accordance with the present invention;

FIG. 2 is a side view in elevation of one form of mounting of a compressor in a condensor section of a roof-mounted air conditioner installation;

FIG. 3 is another side view in elevation showing another type of mounting of a compressor in a condensor section of a roof-mounted air conditioner installation;

FIG. 4 is a cross-sectional view of the installation shown in FIG. 2;

FIG. 5 is a cross-sectional view of the installation shown in FIG. 3; and

FIG. 6 is a perspective view with portions broken away of the preferred roof-mounted illustration shown in FIGS. 1 to 6.

DETAILED DESCRIPTION OF THE PREFERRED EMBODIMENT

Referring in more detail to the drawings, there is illustrated in FIGS. 1 and 6 a preferred form of air conditioning system 10 which is broadly comprised of a condensor section 12, evaporator section 14 and air compressor 16 with a drive motor 17 in a compartment 18 at the rear of the condensor section 12. As a setting for the present invention, the system 10 is shown mounted on the roof R of a passenger bus B with the evaporator section 14 being positioned rearwardly of the condensor section 12, and the air compressor 16 being interposed between the condensor section 12 and evaporator section 14.

In the preferred form, the condensor section 12 has a low profile, generally rectangular housing 20 for a pair of elongated condensor coils 22 which extend in the lengthwise direction of the bus, and fans or blowers 23 are positioned between the condensor coils 22. For a purpose to be described, the coils 22 are interconnected at opposite ends by end walls 24 and 25 so as to leave an interior space or enclosure for the fans 23 and confine the movement of air across the coils 22. The housing 20 is made up of a base panel or frame 26 which conforms to the contour of the roof surface of the bus so as to slope laterally in opposite directions downwardly and away from the center line of the bus, the frame 26 being elongated in the direction of travel of the bus and suitably anchored to the roof surface. The housing has opposite sidewalls 28, each containing air intake grilles 29 along the condensor section and an additional compressor grille 29' along the compressor compartment; and, in addition, the housing includes a front, sloping end wall 30 with air intake grilles 31, a rear wall 32, and an upper surrounding flange 33 for connection of a relatively flat cover 34. The cover 34 when positioned in place effects a sealed engagement with the end walls 24 and 25 thereby confining the air flow across the condensor coils 22.

In order to form a separate compressor compartment in the condensor section 12, a partition wall 35 extends across the condensor housing directly behind and parallel to the rear end wall 25 and which effectively isolates the compressor compartment 18 from the condensor section 12. In other words, when the cover 34 is positioned in place, it will engage the partition wall 35 as well as the end wall 25 to divide the condensor section into the separate condensor and compressor compartments as described. A rotary compressor unit 36 includes an attached or in-line motor 37 which are coupled together with their common longitudinal axis extending transversely of the condensor coils 22. In the preferred form, the compressor compartment is isolated from the condensor section by a common divider wall with flow control openings in the divider wall to establish communication between the compressor compartment and condensor section, and the flow of air is confined to flow across the condensor coil by blocking off opposite ends of the condensor coil to prevent the air flow from the compressor compartment from bypassing the condensor coil and flowing directly into the condensor fans and directly across the condensor coils. A power supply 38 and an oil separator 39 are positioned at opposite ends of the compressor compartment is positioned in the condensor section adjacent to the power supply 38. A receiver tank 40 is also positioned in the condensor section 12 with suitable plumbing to connect into the oil separator 39 in the compressor compartment 18.

The only air flow communication between the compressor compartment 18 and condensor section 12 is via controlled openings in the form of louvered vents 42 in the partition wall 35 to regulate air flow from the compressor compartment 18 into the condensor section 12. A problem associated with the mounting of the compressor 36 on the roof is the ability to accommodate the size of the compressor without unduly enlarging the air conditioning system. As shown in FIGS. 2 and 4, the cover portion 34 over the compressor compartment 18 is raised as at 34'; or, in the alternative, as illustrated in FIGS. 3 and 5, the base panel 26 may be dropped or recessed as at 26' into the roof of the bus so that the compressor 36 and motor 37 may be housed within the compressor section without raising the cover 24.

Referring again to the condensor section 12, the condensor coils 22 have transversely extending fins 50 arranged in laterally spaced relation to one another along opposite sides of the fans 23, and the fins 50 are directly affixed to the base panel 26. In turn, the cover plate 34 fits snugly over the fins 50 and the end walls 24 and 25 so as to fully enclose the fans 23 between the end walls 24 and 25 and limit the movement of air drawn in by the fans 23 through the fins 50. Thus, a series of fans 23 are arranged in tandem centrally between the coils 22 and are aligned beneath discharge openings 52 in the cover 34 so that air that is drawn inwardly across the coils 22 will be discharged upwardly through the openings 52. The louvered vents 42 serve to regulate or control the relative amount of air drawn inwardly through the air intake grilles 29' and compressor compartment 18 to approximately 20% of the total air flow so as to avoid forcing too much air and moisture over the compressor motor 37.

The evaporator section 14 may be of a modular type as set forth and described in my hereinbefore referred to U.S. Pat. No. 4,679,616 and broadly comprises a shallow rectangular housing 60 which encloses a pair of spaced evaporator coils 62, heater elements 64 flanked on either side of the coils 62 and evaporator blower 66. The housing 60 communicates along either side beneath the blower 66 with ducts 68 located beneath the existing roof line of the bus so that the blower 66 will discharge air that is drawn over the coils 62 and heater 64 downwardly through the ducts 68 into the passenger area of the bus. The heater elements 64 in the evaporator section operate in a well known manner to receive hot engine coolant from the engine when desired to increase the temperature in the interior of the bus.

In use, the refrigerant in the system is drawn from the evaporator coil 62 and discharged by the compressor 36 into the condensor coils 22. Outside air is drawn into both the compressor compartment 18 and condensor section 12 through the air intake grilles 29 and 29' by the condensor fans 23 so as to liquify the refrigerant as a result of the air movement across the condensor coils 22 and the increased pressure created by the compressor 36. Any heat given up by the refrigerant in its conversion to the liquid phase is expelled by the condensor fans 23. The liquid refrigerant is directed into the receiving tank 40 and returns to the evaporator section through an expansion valve which controls the amount of refrigerant that enters the evaporator coils for proper coolant vaporization. The refrigerant will then absorb heat from the air passing over the evaporator coils 62 as it is vaporized, the air movement across the evaporator coil 62 being controlled by the evaporator blowers 66.

From the foregoing, it is important to regulate the relative amounts of air flow from the compressor compartment and condensor section across the condensor coils 22 so as not permit too much air to be drawn from the compressor compartment but at the same time establish efficient air circulation in order to cool the compressor 36 as well as to contribute to the passage of air flow across the condensor coils 22. As noted earlier, the louvered vents 42 may be adjusted to regulate the amount of air flow from the compressor compartment, and the enclosed mounting of the condensor coils 22 will confine the flow of air to pass around the end wall 25 and directly across the condensor coils 22 into the condensor fan.

It is therefore to be understood that while a preferred form of invention has been herein set forth and described, various modifications and changes may be made without departing from the spirit and scope of the present invention as defined by the appended claims.

I claim:

1. In an air conditioning system for mounting on a roof of a vehicle wherein a condensor section includes a housing mounted on said roof, at least one condensor coil mounted in said housing, air circulating means including fans for drawing air from the outside through an intake opening in said housing across said condensor coil, an evaporator section, and means for conducting a refrigerant between said condensor and said evaporator sections, the improvement comprising:

a compressor mounted in a separate compartment on said roof adjacent to said condensor section;

means for directing outside air through said compressor compartment;

air flow control means for establishing communication between said compressor compartment and said condensor section, said air circulating means inducing the flow of outside air from said compressor compartment through said air flow control means to mix with the air drawn through the intake opening across said condensor coil; and means for directing the flow of air from said compressor compartment and said intake opening across said condensor coil in said condensor section.

2. In an air conditioning system according to claim 1, including a common divider wall between said condensor section and said compressor compartment, said control means defined by openings in said divider wall, and air exhaust means in said housing above said condensor fans.

3. In an air conditioning system according to claim 1, wherein a pair of said condensor coils are arranged in spaced parallel relation and being elongated in the lengthwise direction of said vehicle, said directing means including an enclosure in said condensor housing for enclosing said fans and opposite ends of said condensor coils, said air intake openings located along opposite sides of said housing, and said fans being interposed between said pair of said condensor coils.

4. In an air conditioning system according to claim 3, said compressor being elongated and extending in a direction normal to the direction of extension of said condensor coils.

5. In an air conditioning system according to claim 4, said compressor extending behind said condensor section.

6. In an air conditioning system according to claim 3, said compressor mounted in said condensor section rearwardly of said condensor coils, and a common divider wall between said compressor and said condensor coils.

7. In an air conditioning system according to claim 6, said compressor section interposed between said condensor section and said evaporator section.

8. In an air conditioning system adapted for mounting on a roof of a vehicle wherein a condensor section includes a housing mounted on said roof, condensor coils mounted in said housing, air circulating means for drawing air from the outside through an intake opening in said housing across said condensor coils, an evaporator section including a housing mounted on said roof and means for conducting a refrigerant between said condensor and said evaporator sections, the improvement comprising:

a compressor mounted in a separate compartment on said roof adjacent to said condensor section;

an air intake for directing outside air into said compressor compartment;

control means establishing communication between said compressor compartment and said condensor section, said air circulating means inducing the flow of air from said compressor compartment into said condensor section to mix with the air drawn through said air intake; and means for confining the flow of air from said compressor compartment and said air intake solely across said condensor coils into said air circulating means.

9. In an air conditioning system, according to claim 8, including a common divider wall between said condensor section and said compressor compartment, said control means defined by openings in said divider wall, there being a plurality of said intake openings disposed along opposite sides and front end of said condensor section, and at least one air discharge opening in said condensor section above said air circulating means.

10. In an air conditioning system according to claim 8, said air circulating means disposed between said condensor coils, and said confining means including an enclosure in said condensor housing for enclosing said condensor fans and opposite ends of said condensor coils.

11. In an air conditioning system according to claim 8, said compressor being elongated and extending behind and normal to the direction of extension of said condensor coils.

12. In an air conditioning system according to claim 8, said compressor mounted in said condensor section rearwardly of said condensor coils, a common divider wall between said compressor and said condensor coils, and said confining means including end walls extending across opposite ends of said condensor coils.

13. In an air conditioning system according to claim 12, said compressor section interposed between said condensor section and said evaporator section.

14. In an air conditioning system according to claim 8, there being a pair of elongated condensor coils extending in spaced parallel relation to one another lengthwise of said vehicle, said air circulating means defined by a plurality of condensor fans mounted in tandem between said condensor coils, said confining means including end walls extending across each of said opposite ends of said condensor coils in sealed relation to said housing, said compressor being elongated and extending behind and normal to the direction of extension of said condensor coils, a reinforcing wall extending between said condensor coils and said compressor, and said control means including louvered vents in said reinforcing wall.

15. In an air conditioning system according to claim 14, said condensor housing including a raised portion extending over said compressor compartment.

16. In an air conditioning system according to claim 14, said compressor compartment being at least partially recessed below the roof of said vehicle.

* * * * *